United States Patent [19]

Feltz et al.

[11] 4,146,313

[45] Mar. 27, 1979

[54] SLOT LOAD MOVIE PROJECTOR MECHANISM

[75] Inventors: Albert J. Feltz, Rochester; Howard C. Deck, Henrietta, both of N.Y.

[73] Assignee: The Singer Company, New York, N.Y.

[21] Appl. No.: 811,916

[22] Filed: Jun. 30, 1977

[51] Int. Cl.$^2$ .............................................. G03B 1/56
[52] U.S. Cl. ..................................... 352/157; 352/159
[58] Field of Search ............... 352/157, 158, 159, 195

[56] References Cited

U.S. PATENT DOCUMENTS

| 3,094,055 | 6/1963 | Elsas | 352/195 |
| 3,737,220 | 6/1973 | Hickey et al. | 352/159 |

*Primary Examiner*—Monroe H. Hayes
*Attorney, Agent, or Firm*—Charles R. Lewis

[57] ABSTRACT

An improved slot load motion picture projector is provided with a cam plate guide assembly connecting the projector control lever with the projector film gate. The cam plate has a cam path formed therein with a cam follower disposed within the cam path. Links connect the cam follower to both the control lever and the film gate. The cam path guide assembly causes the film gate to close during the initial portion of the control lever movement from the load position to the operate position, and causes the film gate to open during the initial portion of the control lever movement from the operate position to the load position.

6 Claims, 6 Drawing Figures

SLOT LOAD MOVIE PROJECTOR MECHANISM

BACKGROUND OF THE INVENTION

1. The Field of the Invention

The present invention relates to improved slot load motion picture projectors, and, more specifically, to the means which connect the projector control lever to the film gate.

2. Description of the Prior Art

Slot load motion picture projectors are a species of projector which have a slot formed in the projector structure for edge wise loading of the film into the projector mechanism. Examples of this type of projector are described in the following two patents assigned to the assignee of the present invention: U.S. Pat. No. 3,734,602 issued May 22, 1973, and U.S. Pat. No. 3,737,220; issued June 5, 1973. The disclosure of these two patents is incorporated herein by reference. The projectors described in these patents include a control lever moveable between a load position and an operate position. The control lever is coupled thru suitable mechanical means to the various film engaging elements of the projector. Such film engaging elements include a supply reel film sprocket with associated pressure rollers, a film gate, sound drum with associated pressure rollers, a take up reel feed sprocket with associated pressure rollers, and various other rollers and film guide surfaces. When the control lever is in the load position the film engaging elements are positioned away from or out of the film slot to permit obstruction free edge wise insertion of the film into the slot. When the control lever is moved to the operate position the film engaging elements are caused to engage the film in a predetermined sequence to complete the film loading. The predetermined sequential movement of the film engaging elements is necessary to form loops at various places in the film projector mechanism. Such loops include an upper film loop between the supply reel feed sprocket and the film gate and a lower film loop between the film gate and the sound drum. To form the upper film loop in the projector referred to above, the film gate is closed during the initial portion of the control lever movement from the load position to the operating position. Control lever movement after the initial portion is then used to cause the supply reel film sprocket pressure rollers to entrain the film on a surface portion of the supply reel feed sprocket and to cause a rotation of the feed sprocket to form a loop between the closed film gate and the supply reel feed sprocket.

A mechanism for closing the film gate during the initial control lever movement is described in the above referenced patents. While this mechanism performs adequately, it requires a plurality of complex, close tolerance parts fabricated from wear resistent material. This mechanism must be run in over a period of time and then adjusted within close operating limits to perform satisfactorily. In use, the mechanism can go out of adjustment and require readjustment by a trained projector technician.

The present invention provides mechanical means to couple the control lever to the film gate to cause the film gate to close during the initial portion of the control lever movement. The mechanism embodied by the present invention for use with slot load motion picture projectors is inexpensive to manufacture and assemble, and requires no adjustment.

SUMMARY

An improved motion picture projector of the type having a film gate reciprocally moveable between an open position and a closed position and a control lever reciprocally moveable between a load position and an operate position. A first link having a first end connected to the control lever and a second link having a first end connected to the film gate are connected at their second ends by a cam follower. The cam follower is disposed within a cam path formed in a cam plate and restrained for movement along the cam path. The cam path is so formed that movement of the control lever from the load position to the operate position causes the film gate to close during the initial portion of the control lever movement, and movement of the control lever from the operate position to the load position causes the film gate to open during the initial portion of the control lever movement.

BRIEF DESCRIPTION OF THE DRAWINGS

The present invention will be fully understood from consideration of the following detailed description taken in conjunction with the accompanying drawings, in which like reference characters refer to like parts in the several views, and wherein.

DESCRIPTION OF THE PREFERRED EMBODIMENT

Figure 1:
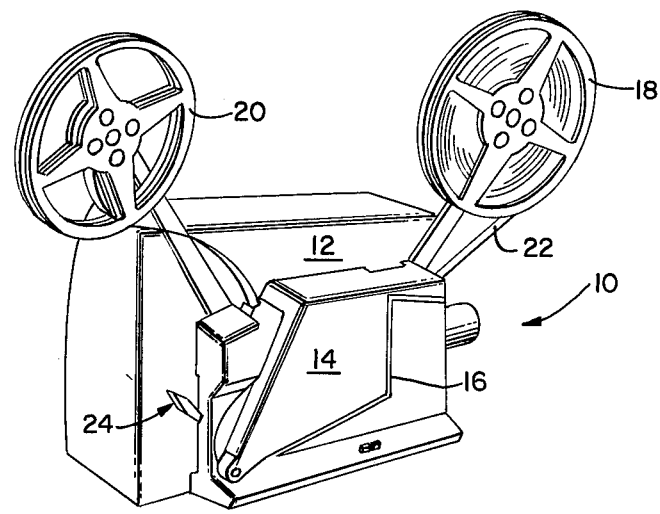
FIG. 1 is a perspective view of a slot load motion picture projector incorporating the preferred embodiment of the present invention.

A slot load motion picture projector 10 into which the present invention may be incorporated is shown in FIG. 1 and includes a generally planar sidewall 12 and a housing 14 having a loading slot 16 formed therein. The slot 16 follows a path with several curves and runs between a supply reel 18 and a take up reel 20. The edges of the slot 16 have tapered surfaces arranged so a section of film 22 can be grasped near its free end, moved along the slot 16, and pulled snug between the supply reel 18 and the takeup reel 20 to cause the film 22 to slide in an edgewise direction into the slot 16. A control lever 24 is positioned toward the rear of the projector 10 and is moveable between an upper, operate position shown in FIG. 1, and a lower, load position. The control lever 24 is coupled by various coupling mechanisms to the film 22 engaging elements located internal to the projector 10 and discussed in more detail below. In the lower control lever 24 position the film 22 engaging elements are moved away from the vicinity of the slot 16 to permit obstruction free loading of the film 22 into the slot 16. In the upper operate position the film engaging elements are moved by their respective coupling mechanisms into engagment with the film 22 in a predetermined sequence to entrain and form the film 22 for projection.

Figure 2:
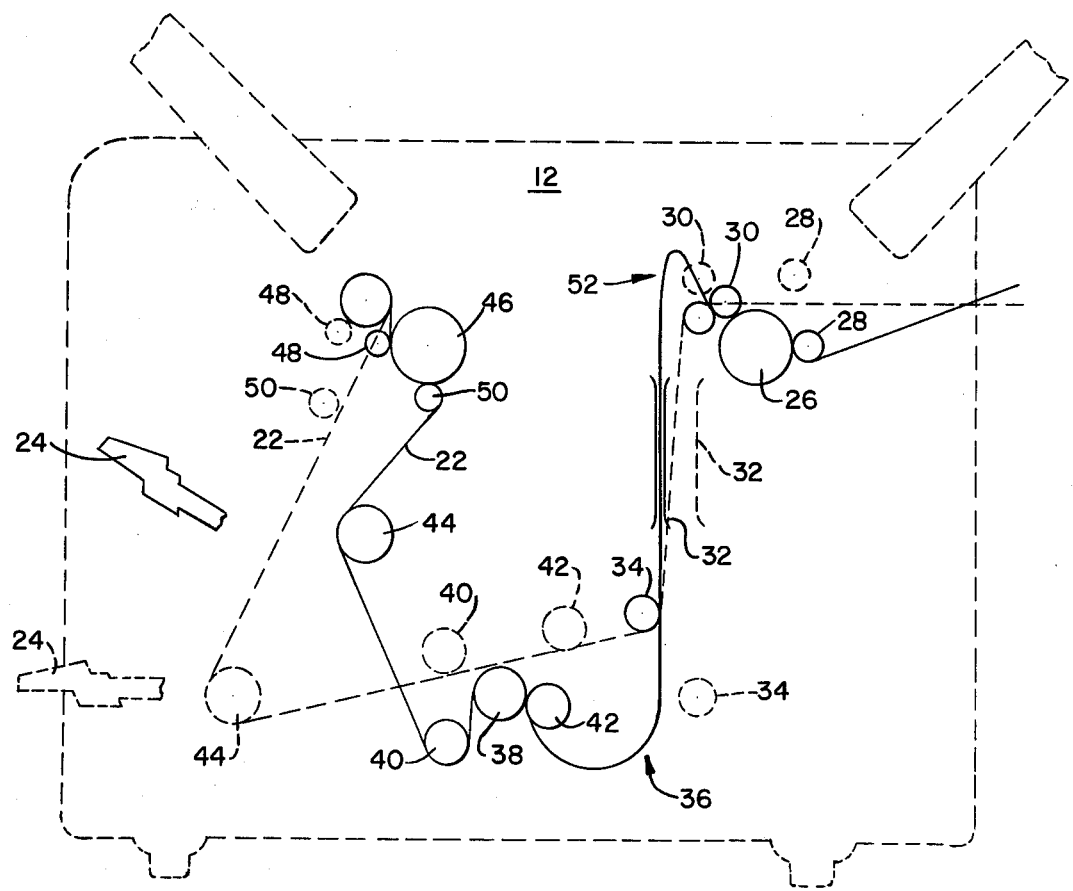
FIG. 2 is a side elevational schematic view of various film engaging elements of the projector illustrated in FIG. 1 showing the elements in both the load position (broken line illustration) and their operate position (solid line illustration)

FIG. 2 schematically illustrates the control lever 24 and the various film 22 engaging elements in their respective load and operate positions. Structure not essential to an understanding of FIG. 2 has been eliminated. The broken line illustration represents the positions of the film 22 engaging elements at the lower load position of the control lever 24, and the solid line illustration represents the position of the film 22 engaging elements in the upper operate position of the control lever 24. The broken line illustration of the film 22 in FIG. 2 conforms to the path of the loading slot 16, and the solid line illustration of the film 22 conforms to the position of the film 22 during projection.

A supply reel feed sprocket 26 is rotatably mounted on the upper right portion of the projector sidewall 12. Pressure rollers 28 and 30 are associated with the supply reel feed sprocket 26 and are moveable from a load position to an operate position to entrain the film 22 about a surface portion of the supply reel feed sprocket 26.

A film gate 32 is located below the supply reed feed sprocket 26 and is operable between an open, load position and a closed, operate position.

A moveable guide roller 34 is located below the film gate 32. During the loading of film 22, the guide roller 34 is held at its sloid line position. Upon projector 10 start-up, the guide roller 34 translates to its broken line position and back to its solid line position. This reciprocation of the guide roller 34 during projector start-up forms a slack film loop 34, known as the lower loop, between the film gate 32 and the sound drum 38. The purpose of the lower loop 36 is to isolate the incremental motion imparted to the film 22 as it is driven thru the film gate 32 from the sound frum 38.

A sound drum 38 is located at the lower central portion of the projector sidewall 12. Moveable pressure rollers 40 and 42 are associated with the sound drum 38 and moveable between a load position and an operate position to entrain the film 22 about a surface portion of the sound drum 38.

A guide roller 44 is moveable between a load position and an operate position is provided to assist in forming the film 22 during projection.

A takeup reel sprocket 46 is located at the upper left portion of the projector sidewall 12. Pressure rollers 48 and 50 are associated with takeup reel sprocket 46 and are moveable between a load position and an operate position to entrain the film 22 about a surface portion of the takeup reel sprocket 46.

As shown in FIG. 2 an upper film loop 52 is formed in the film 22 in the region between the supply reel feed sprocket 26 and the film gate 32. In order to form the upper loop 52 when moving the control lever 24 from its lower, load position to its upper, operate position, it is necessary that the film gate 32 be closed during the initial portion of the control lever 24 upward movement, the pressure rollers 28 and 30 be moved into their solid line position to maintain the film 22 in engagement with the supply reel feed sprocket 26, and the supply reel feed sprocket 26 be rotated in a counter clockwise direction to cause the upper loop 52 to form in the film 22 between the supply reel feed sprocket 26 and the film gate 32.

Known prior art mechanisms used to close the film gate 32 during the initial upward movement of the control lever 24 have been relatively complicated, expensive, and have required careful adjustment.

Figure 3:
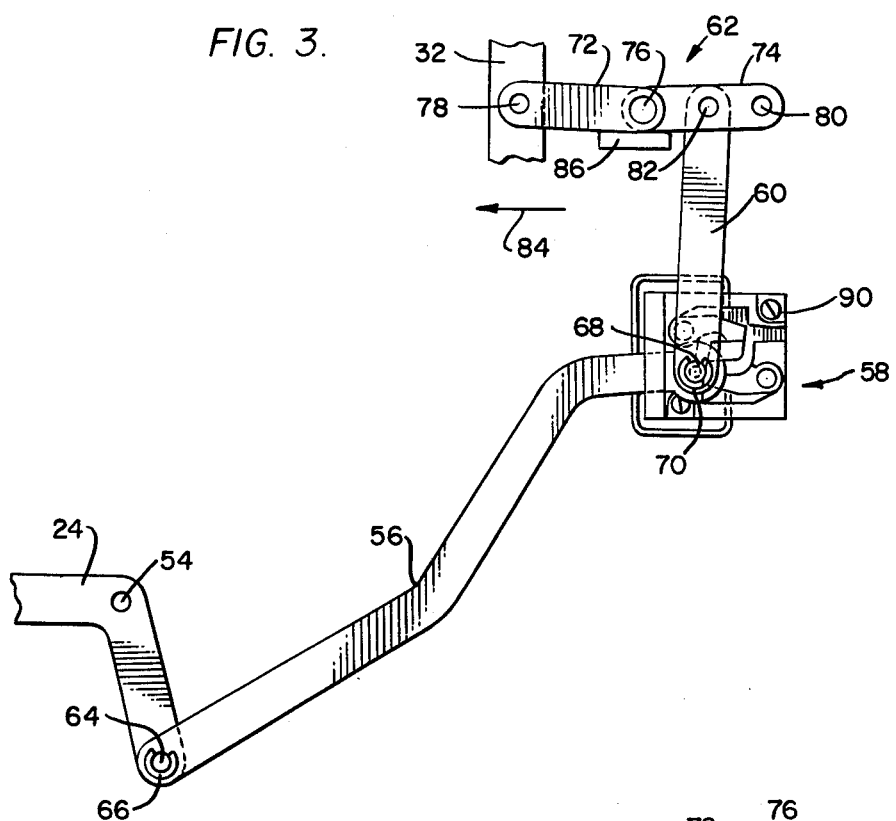
FIG. 3 is a side elevation view showing a control lever in an upper operate position, a film gate in a closed position, an upper link, a lower link, and a cam follower in a guide assembly.
Figure 4:
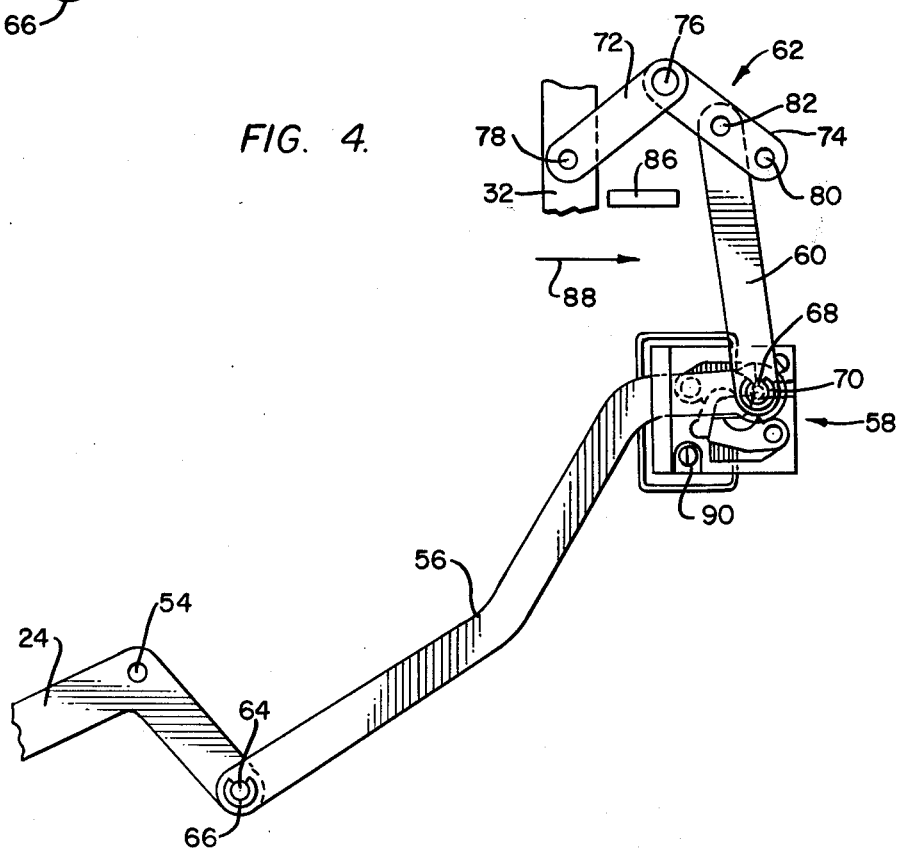
FIG. 4 is a side elevation view of the elements illustrated in FIG. 3 showing the relative position of those elements with the control lever in the lower load position and the film gate in the open position.

FIGS. 3, 4, 5, and 6 illustrate applicant's means to couple the control lever 24 to the film gate 32 to cause the film gate 32 to close during the initial upward movement of the control lever 24 from the load position to the operate position, and to cause the film gate 32 to open during the initial downward movement of the control lever 24 from the operate position to the load position. FIG. 3 illustrates the relative position of the various elements, described below, when the control lever 24 is in the upper operate position; and FIG. 4 illustrates the relationship of the same elements when the control lever 24 is in the lower, load position. The various film 22 engaging elements shown in FIG. 2 and described above have been omitted from FIGS. 3 and 4 for reasons of clarity.

As shown in FIGS. 3 and 4, the control lever 24 (partially illustrated) is rotatably mounted on a pin 54 which is secured to and extends laterally outward from the projector sidewall 12. The control lever 24 is pivotable between an upper position shown in FIG. 3 and a lower position shown in FIG. 4. The film gate 32 (partially illustrated) is moveable on suitable guides (not shown) between a closed position shown in FIG. 3 and in open position shown in FIG. 4. When the film gate 32 is in the open position the film 22 may be readily inserted or removed from the film gate 32. The control lever 24 and the film gate 32 are connected by a first or lower link 56, a guide assembly, generally designated by the reference character 58, a second or upper link 60, and a toggle assembly 62.

A pin 64 secured to the distal end of the control lever 24 passes thru a clearance hole in the left end of the lower link 56 to pivotably connect the control lever 24 to the lower link 56. The lower link 56 is retained in place on the pin 64 by a "C" ring 66. A pin 68 secured to the right end of the lower link 56 passes thru a clearance hole in the lower end of the upper link 60 to pivotably connect the lower 56 to the upper link 60. The upper link 60, which is retained in place on the pin 68 by a "C" ring 70, includes a portion that serves as a cam follower as described below.

The toggle assembly 62 comprises a first toggle link 72 and a second toggle link 74 pivotably connected together by a shoulder pin 76. The pin 76 is secured to the right end of the first toggle link 72 and passes thru a clearance hole in the left end of the second toggle link 74. The left end of the first toggle link 72 is pivotably connected to the film gate 32 by a pin 78 which is secured to and extends laterally outward from the film gate 32. In an analoguous manner the right end of the second toggle link 74 is pivotably connected to the projector sidewall 12 by a pin 80 which is secured to and extends laterally outward from the projector sidewall 12.

The upper link 60 is pivotably connected to a point on the second toggle link 74 intermediate the ends of the second link 74 by a pin 82 which passes thru a clearance hole in the upper end of the upper link 60.

When the control lever 24 is moved to its upper operate position (FIG. 3) the guide assembly 58, described below, in combination with the lower link 56, and the upper link 60 pulls the toggle assembly 62 downward to cause the film gate 32 to move to the left in the direction of the arrow 84 and close the film gate 32 as shown in FIG. 3. A toggle stop 86 is provided to limit the downward movement of the toggle assembly 62 and the leftward movement of the film gate 32.

When the control lever 24 is moved to its lower load position (FIG. 4) the guide assembly 58, described below, in combination with the lower link 56, and the upper link 60 pushes the toggle assembly 62 upward to cause the film gate 32 to move to the right in the direction of the arrow 88 and open the film gate 32 as shown in FIG. 4.

Figure 5:
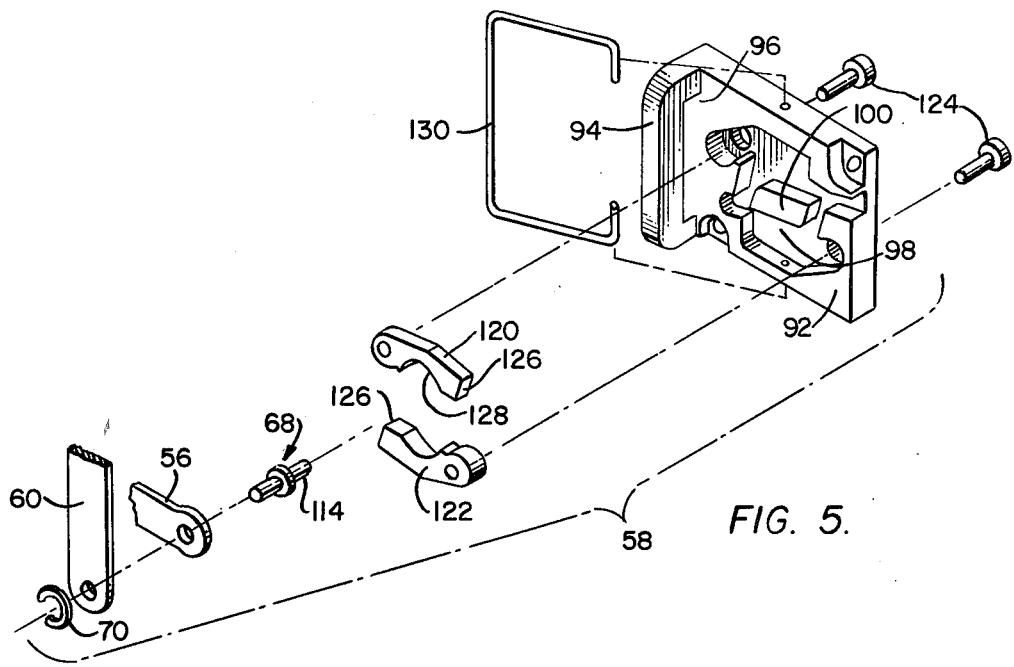
FIG. 5 is an exploded perspective view of the guide assembly illustrated in FIGS. 3 and 4.
Figure 6:
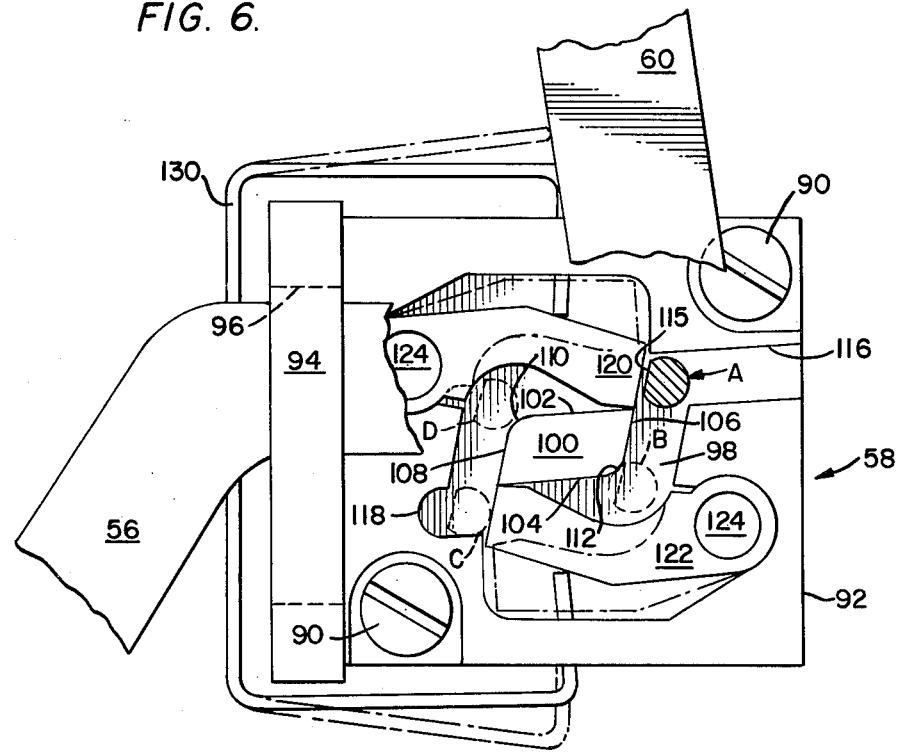
FIG. 6 is a side elevational view of the guide assembly illustrated in FIGS. 3, 4, and 5.

The guide assembly 58 shown in exploded perspective in FIG. 5, and in side elevation in FIG. 6, is secured to the projector sidewall 12 by threaded fastners 90. The guide assembly 58 includes a flat cam plate 92 having various structural features, described below, cut or formed therein. A flange 94, extends laterally outward from one edge of the cam plate 92. The flange 94 has a vertical slot 96 formed therein. The slot 96 is shown in perspective in FIG. 5 and in phantom in FIG. 6. The upper end of the lower link 56 passes thru the slot 96 as shown in FIGS. 3, 4, and 6. The lower link 56 is vertically reciprocal in the slot 96 but is restrained therein from any lateral movement away from the projector sidewall 12. The cam plate 92 and flange 94 may be formed from any suitable material including a wear resistant plastic. In the preferred embodiment, the cam plate 92 and the flange 94 are molded as a one piece unit from a polycarbonate, glass and teflon composite.

The cam plate 92 has a channel cut or formed therein to define a closed cam path 98 having the approximate form of a parallelogram. The cam path 98 is established by a cam block 100 centrally located on the cam plate 98. The cam block 100 has the approximate form of a parallelogram having an upper surface 102, a lower surface 104, a side surface 106, and another side surface 108. The diagonally opposite corners 110 and 112 of the cam block 100 are rounded. The cam follower 114 portion of the pin 68 (FIG. 5), which is pivotably connected to both the upper link 60 and the lower link 56, as described above, is disposed within the cam path 98. The slot 96 which restrains the lower link 56 from any lateral movement away from the projection side wall 12 maintains the cam follower 114 within the cam path 98. The width of the cam path 98 is somewhat wider than the cam follower 114 diameter to allow the cam follower 114 to travel freely along the cam path 98. The cam follower 114 has a flat surface 115 on the load bearing side which is constructed parallel to the guide surface 106 of the cam block 100. The purpose of the flat surface 115 is to distribute the load across the cam block 100 side surface 106. A groove 116 is provided adjacent the cam path 98 to facilitate assembly of the guide assembly 58 during manufacture and to allow for over travel of the cam follower 114. The over travel provision serves to accomodate accumulated tolerances in the various links. In a like manner, an indent 118 is provided on the cam plate 92, diagonally opposite the groove 116, to allow for over travel of the cam follower 114 and thereby accommodate any accumulated tolerances.

The cam plate 92 is provided with an upper switch 120 and a lower switch 122 whose function is to constrain the cam follower 114 for one way or unilateral travel along the cam path 98. Each switch 120, 122 is pivotably connected to the cam plate 92 by suitable means, such as rivets 124 and is pivotable between the solid illustration of FIG. 6 and the broken line illustration of FIG. 6. Both the upper switch 120 and the lower switch 122 have a blunt or flat distal end 126 and an arcuate inner surface 128. The upper switch 120 and the lower switch 122 are resiliently biased toward each other by a "U" shaped wire spring 130. When the upper switch 120 and/or the lower switch 122 are pivoted to their broken line positions as illustrated in FIG. 6, the spring 130 is deflected to its broken line position as illustrated in FIG. 6.

The cam plate 92 in combination with the upper switch 120 and the lower switch 122 serve to guide the motion of the cam follower 114, the lower link 56, and the upper link 60 connected thereto as follows. When the control lever 24 is in its lower load position (FIG. 4) the lower link 56 is positioned at the upper end of the slot 96 and the cam follower 114 is at position A as shown in FIG. 6. The upper link 60 and the toggle assembly 62 are at their upper position and the film gate 32 is open. During the initial upward movement of the control lever 24 from the lower load position (FIG. 4) to the upper operate or project position (FIG. 5) the flat surface 115 of the cam follower 114 is forced against the flat end 126 of the upper switch 120 and cammed down onto the right side 106 of the cam block 100 to a position B (FIG. 6, broken line illustration). The force exerted by the cam follower 114 against the flat end 126 of the upper switch 120 acts in combination with the force supplied by the spring 130 to maintain the upper switch 120 in position against the cam block 100. The movement of the cam follower 114 from the position A to the position B moves the upper link 60 downward and forces the toggle assembly 62 to its lower position against the toggle stop 86 and thereby causes the film gate 32 to close during the initial upward movement of the control lever 24. Movement of the control lever 24 subsequent to the initial movement causes the cam follower 114 to move leftward along the lower surface 104 of the cam block 100 to a position C (FIG. 6, broken line illustration). This movement of the cam follower 114 from the position B to the position C occurs after the initial upward movement of the control lever 24 from the load position and does not effect the closed state of the film gate 32. In this way upward movement of the control lever 24 after the initial movement (which causes the film gate 32 to close) may be utilized to cause the supply reel feed sprocket 26 rollers 28 and 30 to entrain the film 22 on a surface portion of the supply reel feed sprocket 26, and to cause a rotation of the feed sprocket 26 to form an upper film loop 52 between the closed film gate 32 and the supply reel feed sprocket 26. Means to accomplish the formation of the upper film loop 52 after the film gate 32 is closed is disclosed in the above referenced patents, the disclosure of which is incorporated herein by reference.

When the control lever 24 is at its upper operate position (FIG. 3), the lower link 56 is positioned at the lower end of the slot 96 and the cam follower 114 is at position C (FIG. 6). The upper link 60 and the toggle assembly 62 are at their lower most position and the film gate 32 is closed as described above. During the initial downward movement of the control lever 24 from the upper operate or project position to the lower load position, the cam follower 114 is forced against the flat end 126 of the lower switch 122 and cammed upward onto the left side 108 of the cam block 100 to a position D (FIG. 6, broken line illustration). This movement of the cam follower 114 from the position C to the position D moves the upper link 60 upward and forces the toggle assembly 62 to its upper position and thereby causes the film gate 32 to open during the initial downward movement of the control lever 24. Downward movement of the control lever 24 subsequent to the initial downward movement causes the cam follower 114 to move to the right along the upper surface 102 of the cam block 100 to the position A. This downward movement of the control lever 24 after the initial downward movement (which causes the film gate 32 to open) is utilized to move the various film engaging elements illustrated in FIG. 2 from their solid line position to their broken line position and thereby permit convenient edgewise removal of the film 22 from the loading slot 16.

As is evident the present invention provides a mechanism to assist in setting the upper loop in a motion picture projector which is fabricated from a comparatively few parts, is inexpensive, and requires no adjustment to assure reliable operation.

As is apparent to those skilled in the art, various changes and modifications may be made to the invention described herein without departing from the scope and spirit of the present invention as defined in the claims and their legal equivalent.

We claim:

1. An improved motion picture projector of the type having
    a film gate reciprocally moveable between an open position and a closed position;
    a control lever reciprocally moveable between a load position and an operate position;
    a first link having a first end pivotably connected to said control lever;
    a second link having a first end operably connected to said film gate;
    where the improvement comprises:
    a cam follower pivotably connected to both the second end of said first link and the second end of said second link;
    a cam plate having a closed cam path formed therein;
    said cam follower disposed within said cam path and restrained for movement along said cam path;
    whereby movement of said control lever from said load position to said operate position causes said film gate to close during the initial portion of said movement of said control lever from said load position to said operate position and open during the initial portion of movement of said control lever from said operate position to said load position.

2. The improved motion picture projector claimed in claim 1 further comprising:
    a toggle assembly operably connected between said film gate and said first end of said second link.

3. The improved motion picture projector claimed in claim 2 wherein said closed circuit has the form of a parallelogram.

4. The improved motion picture projector claimed in claim 1 wherein said cam plate further comprises:
    a flange extending from said cam plate;
    said flange having a slot formed therein;
    said second end of said first link passing thru said slot.

5. The improved motion picture projector claimed in claim 1 wherein;
    said cam follower is restrained for one way movement along said cam path.

6. The improved motion picture projector claimed in claim 5 further comprising:
    a first switch pivotable into and out of said cam path;
    a second switch pivotable into and out of said cam path;
    resilient biasing means to resilient urge said first and said second switch into said cam path.

* * * * *